April 19, 1927.  
C. SIMMONS  
1,625,226  
AUTOMOBILE BRAKE AND JACK  
Filed Dec. 22, 1925
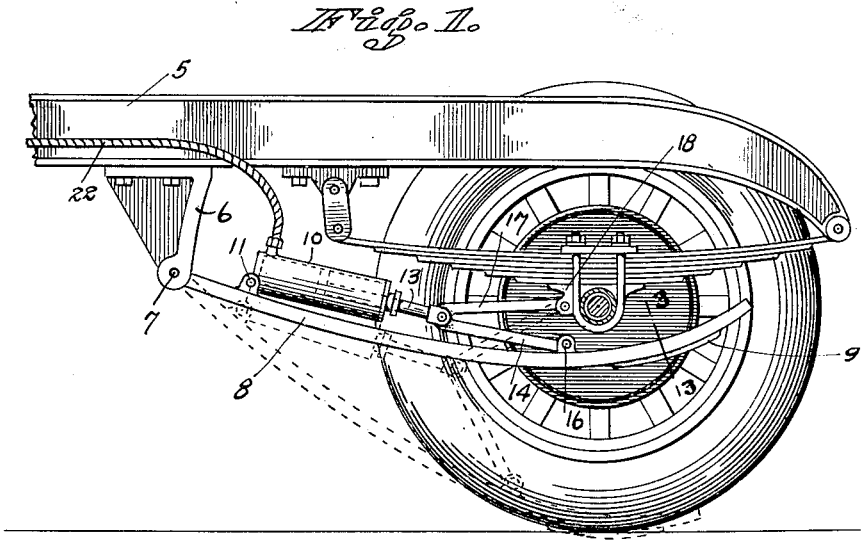
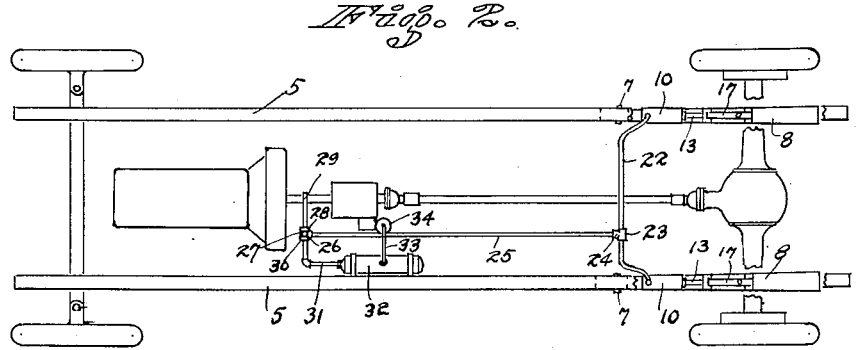
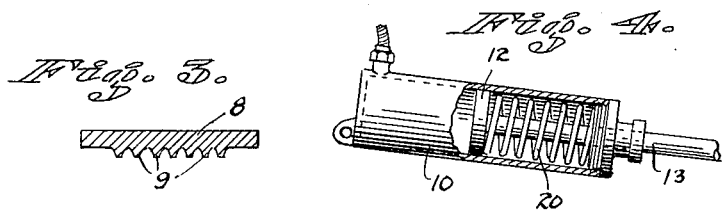
INVENTOR.  
CLAUDE SIMMONS  
BY  
ATTORNEYS.

Patented Apr. 19, 1927.

1,625,226

UNITED STATES PATENT OFFICE.

CLAUDE SIMMONS, OF RENO, NEVADA.

AUTOMOBILE BRAKE AND JACK.

Application filed December 22, 1925. Serial No. 77,053.

This invention relates to vehicle brakes.

An object of my present invention is the provision of a brake for an automobile or other vehicle.

Another object of my invention is the provision of a vehicle brake which will act not only to brake a vehicle, but which will also prevent skidding.

A further object of my invention is the provision of a brake which may also be employed as a jack.

With the foregoing objects in view, together with such other objects as may subsequently appear, this invention resides in the construction and arrangement of parts hereinafter described and claimed, and illustrated in the accompanying drawings, in which Figure 1 is a fragmentary side elevation of a vehicle showing the rear end thereof with the device of my invention applied thereto.

Figure 2 is a plan view of the chassis of an automobile showing my device applied thereto.

Figure 3 is a section taken on the line 3—3 of Figure 1, and

Figure 4 shows a cylinder partly broken away and the piston rod employed therewith, the same being used in my invention.

Referring to the drawing for more detailed description thereof, the numerals 5 indicate the sides of the frame of the vehicle. To the undersides of the members 5 are secured brackets 6 to which are pivoted at 7 arcuate brakes 8 extending rearwardly from the pivots 7. Near the rear ends of the brakes 8 the lower faces thereof are corrugated, being provided with spaced parallel projections 9 adapted to engage the rod when the brake is actuated to engage the rod, the mentioned corrugations being distinctly shown in Figure 3. Cylinders 10 illustrated in Figure 4 are pivotally mounted as shown by the numeral 11 on the brakes, and extend rearwardly of their pivots. Within the cylinders 10 pistons 12 are disposed, these pistons being provided with piston rods 13 which extend outside of the cylinder. To the outer ends of the piston rods 13 are pivotally secured rods 14, the other ends of the rods 14 being pivotally secured as shown at 16 to the brakes 8. Rods 17 are also pivotally secured to the outer ends of the piston rods 13 and are also pivotally secured at their other ends to brackets 18.

Coiled springs 20 encircle the piston rods 13 within the cylinders 10. Coiled springs 20 are disposed between the rear ends of the cylinders and the pistons, and function to normally hold the brakes above the ground.

According to my invention, I may actuate the pistons 12 by hydraulic pressure or by compressed air, or equivalents. To that end I provide, as shown in Figure 2, a pipe 22 communicating at both ends with interiors of the cylinders 10 at their forward ends. The pipe 22 comprises a T 23, the branch 24 of which is connected with a pipe 25 connected to a branch 26 of a three-way valve 27. The branch 28 of the three-way valve 27 is connected to an exhaust pipe 29, the other branch 30 of the three-way valve 27 being connected by pipe 31 with a cylinder 32 containing a supply of compressed air. The cylinder 32 is connected by pipe 33 with a pressure pump 34 which may be geared to the main drive of the automobile, the construction being well known. By turning the three-way valve to its proper position, compressed air may be released from the cylinder 32 and directed into the cylinder 10 in order to push pistons 12 rearwardly in their cylinders, the piston rods 13 thereby being projected rearwardly and effecting through the rods 14 a depression of the brakes 8 until the latter come into contact with the road, as shown in dotted lines in Figure 1. If sufficient pressure is employed, the brakes 8 may be forced down so that they are effective in reducing the pressure which the wheels normally exert on the road. The brakes may also be effective to raise the wheels off the road whereby they act as jacks. By proper manipulation of the three-way valve, air may be released from the cylinders 10 to the atmosphere through the exhaust pipe 29. The coiled springs 20 in the cylinders 10 will then be effective to push the pistons 12 forwardly so that the brakes 8 are thereby raised from the ground.

Although I have shown and described one embodiment of my invention, it is to be understood that the same is susceptible of various changes; and I reserve the right to employ such as may come within the scope of the appended claim.

I claim:

Vehicle brake apparatus comprising a pivoted brake adapted to contact with the ground, a cylinder pivotally mounted on said brake, a piston in said cylinder, a piston rod for said piston, a second rod pivoted to said piston rod at one end and to said brake at its other end, and a third rod pivoted at both ends, one end of the same being pivoted to one of the other said rods and the other end to a relatively fixed support.

CLAUDE SIMMONS.